United States Patent
Stekelenburg et al.

(10) Patent No.: US 9,340,081 B2
(45) Date of Patent: May 17, 2016

(54) VEHICLE

(71) Applicant: PAL-V EUROPE, N.V., Raamsdonksveer (NL)

(72) Inventors: Michael Alwin William Stekelenburg, Vught (NL); Christiaan Cornelis Klok, Rotterdam (NL); Louis Petrus Valentijn Marie Van Rijn, Berkel en Rodenrijs (NL); Wouter Adriaan Soethoudt, The Hague (NL); Robert Christiaan Wegerif, Apeldoorn (NL)

(73) Assignee: PAL-V EUROPE N.V., Raamsdonksveeer (NL)

( * ) Notice: Subject to any disclaimer, the term of this patent is extended or adjusted under 35 U.S.C. 154(b) by 0 days.

(21) Appl. No.: 14/357,075

(22) PCT Filed: Nov. 9, 2012

(86) PCT No.: PCT/NL2012/000070
§ 371 (c)(1),
(2) Date: May 8, 2014

(87) PCT Pub. No.: WO2013/070061
PCT Pub. Date: May 16, 2013

(65) Prior Publication Data
US 2014/0291440 A1 Oct. 2, 2014

(30) Foreign Application Priority Data
Nov. 11, 2011 (NL) ...................................... 1039163

(51) Int. Cl.
| | | |
|---|---|---|
| B64C 1/30 | (2006.01) |
| B64C 1/26 | (2006.01) |
| B64C 37/00 | (2006.01) |
| B60F 5/02 | (2006.01) |
| B64C 1/06 | (2006.01) |
| B64C 27/02 | (2006.01) |
| B64C 27/50 | (2006.01) |

(52) U.S. Cl.
CPC . B60F 5/02 (2013.01); B64C 1/063 (2013.01); B64C 1/30 (2013.01); B64C 27/02 (2013.01); B64C 27/50 (2013.01); B64C 37/00 (2013.01)

(58) Field of Classification Search
CPC ............ B64C 1/30; B64C 1/26; B64C 1/063; B64C 27/50; B64C 37/00
See application file for complete search history.

(56) References Cited

U.S. PATENT DOCUMENTS 2,940,688 A    6/1960   Bland
4,627,585 A *  12/1986  Einstein ............................ 244/2

(Continued)

OTHER PUBLICATIONS

The International Search Report dated Mar. 4, 2013.

*Primary Examiner* — Tien Dinh
*Assistant Examiner* — Richard R Green
(74) *Attorney, Agent, or Firm* — Troutman Sanders LLP; Ryan A. Schneider; Daniel T. Sharpe

(57) ABSTRACT

The present invention discloses a vehicle (1) capable of being converted between a flying condition and an automotive riding condition. The vehicle has a telescopically extendable tail (10) comprising a first tubular tail segment (11) and a second tail segment (12) disposed axially slideable within the first tubular tail segment. The tail is provided with at least two form-closing coupling members (21, 35; 31, 36) located at an axial distance (LI) from each other for providing a force-transferring coupling between the second tail segment (12) and the first tubular tail segment (11) in the extended state of the second tail segment (12), each of said form-closing coupling members (21, 35; 31, 36) capable of transferring torque and transverse forces, and each of said form-closing coupling members (21, 35; 31, 36) coming into engagement by axial displacement of the second tail segment (12) in the outward direction.

19 Claims, 11 Drawing Sheets

(56) References Cited

U.S. PATENT DOCUMENTS

| | | |
|---|---|---|
| 4,706,907 A | 11/1987 | Kopylov |
| 5,050,817 A * | 9/1991 | Miller .............................. 244/2 |
| 5,203,520 A | 4/1993 | Przygodzki et al. |
| 6,050,521 A * | 4/2000 | Regonini ........................ 244/60 |
| 6,164,590 A * | 12/2000 | Kusic .......................... 244/17.11 |
| 2008/0067284 A1* | 3/2008 | Bakker ....................... 244/17.11 |
| 2011/0036939 A1 | 2/2011 | Easter |
| 2013/0126666 A1* | 5/2013 | Brown .............................. 244/2 |

* cited by examiner

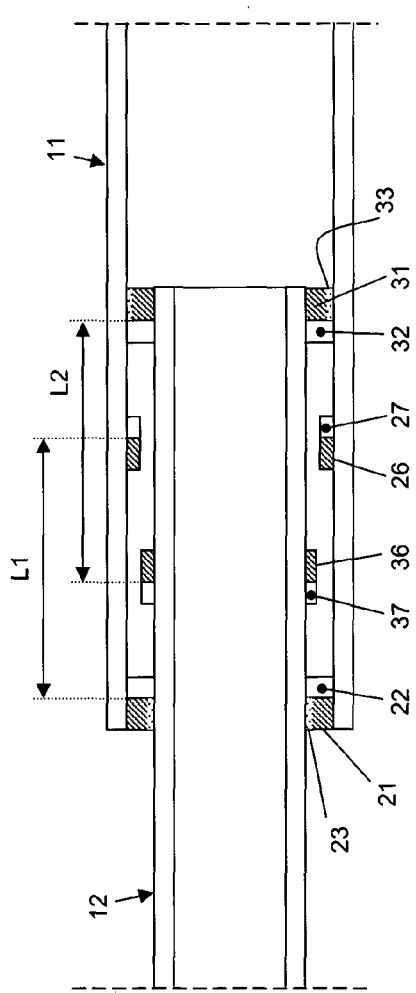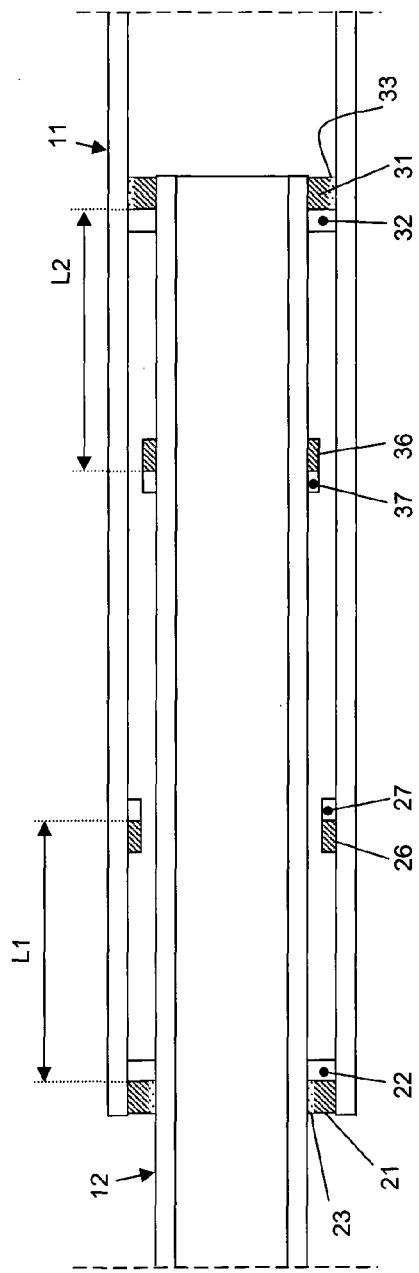
FIG. 2A
FIG. 2B

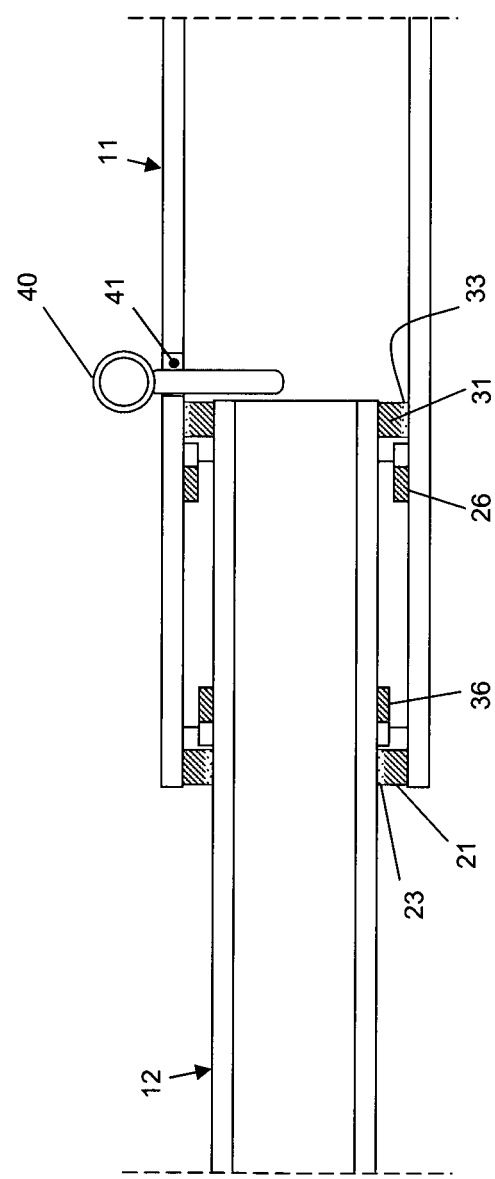

VEHICLE

CROSS-REFERENCE TO RELATED APPLICATIONS

This application is a US National Stage of International Application No. PCT/NL2012/000070, filed 9 Nov. 2012, which claims the benefit of NL Application 1039163, filed 11 Nov. 2011, both herein fully incorporated by reference.

FIELD OF THE INVENTION

The present invention relates in general to a vehicle capable of flying in air. Typically, it is customary for airplanes and helicopters to be either flying or standing on the ground, in a parking condition. Nevertheless, it is customary for airplanes and helicopters to have wheels, so that they can be displaced over ground, for instance towards and from a parking location. Airplanes and helicopters may even ride over land, for instance during take-off or landing or during taxiing: except during landing when they already have airspeed, they use their air-propulsion for creating forward groundspeed. However, such ground travel is typically over a relatively short distance at a relatively low speed (except for take-off or landing), and such air-vehicles are not suitable for participating in road traffic.

On the other hand, for road traffic, cars have been developed, and they must meet requirements regarding size, manoeuvrability, safety, etc. These requirements are not met by flying vehicles, and airplanes and helicopters are not certified for use in traffic on public roads.

While flying machines are not equipped for road traffic, cars are not equipped for flying. Nevertheless, it is desirable to have a vehicle that can be converted from a flying condition to an automotive riding condition, and vice versa.

Specifically, the present invention relates in general to a combined land and air vehicle, i.e. a vehicle that can operate in a flying mode in which it is capable of flying in air and in an automotive riding mode in which it can drive on a road, much like a car. The requirements to the configurations in both operating modes are quite different, and it is a challenge to make the vehicle in such a manner that all requirements will be met and that changing the configuration from one mode to the other or vice versa can be done in an easy, safe and reliable manner.

One aspect of the present invention relates to the tail. In the flying mode, the vehicle has a relatively long tail for stability. In the riding mode, such long tail is not needed, can be considered a hindrance, and it may even be that the overall length is too long with respect to traffic regulations. Therefore, it is desirable that the tail is extendable for a transition from the riding mode to the flying mode and retractable for a transition from the flying mode to the riding mode. It is noted that a retractable tail is also useful for flying machines which do not have such riding mode, to allow the flying machine to be parked or transported while requiring less space.

In the extended flying mode, the tail is subjected to several forces, which must be transferred reliably to the main body of the vehicle. Therefore, the extended tail must be fixed reliably. When the user makes a mistake in extending the tail, the consequences can be dramatical if the tail is not fixed correctly. The present invention aims to provide an extendable tail design that can easily and almost error-free be handled by user.

The tail is provided with movable parts such as rudders and/or ailerons, which are controlled by cables. These cables have a length adapted to the tail in its extended state. When the tail is retracted, these cables are too long, and if the cables are not in a tightened state they sag and may become stuck in the mechanism. One obvious solution might be to use an automatic roller for winding the excess length of cable, but this may lead to higher steering forces being needed and/or an increased risk of a cable getting stuck. The present invention aims to overcome this problem without the need of any user action.

For propulsion in the flying mode, the vehicle may comprise a propeller mounted at the rear of the vehicle. The span of the propeller defines a forbidden area for the tail. The present invention aims to provide a design for an extendable tail that can be combined with a propeller.

For providing lift in the flying mode, the vehicle requires a rotor having rotor blades of considerable length. In the riding mode, those blades are too long, so it is required to reduce the length of the rotor blades. While this requirement is known per se (see for instance WO-2006/041287), it is difficult to provide a reliable solution that combines sufficient strength with good aerodynamic behaviour and acceptable manufacturing costs. The present invention aims to provide such design.

It is to be noted that many of the features of the present invention are also advantageous for a vehicle that is intended for flight only but having a retractable tail and foldable rotor blades for reducing the space requirements during transport and/or storage.

BRIEF DESCRIPTION OF THE DRAWINGS

The present invention will be further explained by the following description of one or more preferred embodiments with reference to the drawings, in which same reference numerals indicate same or similar parts, and in which:

FIGS. 2A-2C are a schematic longitudinal cross sections of a portion of a telescopically extendable tail beam;

DETAILED DESCRIPTION OF THE INVENTION

Figure 1:
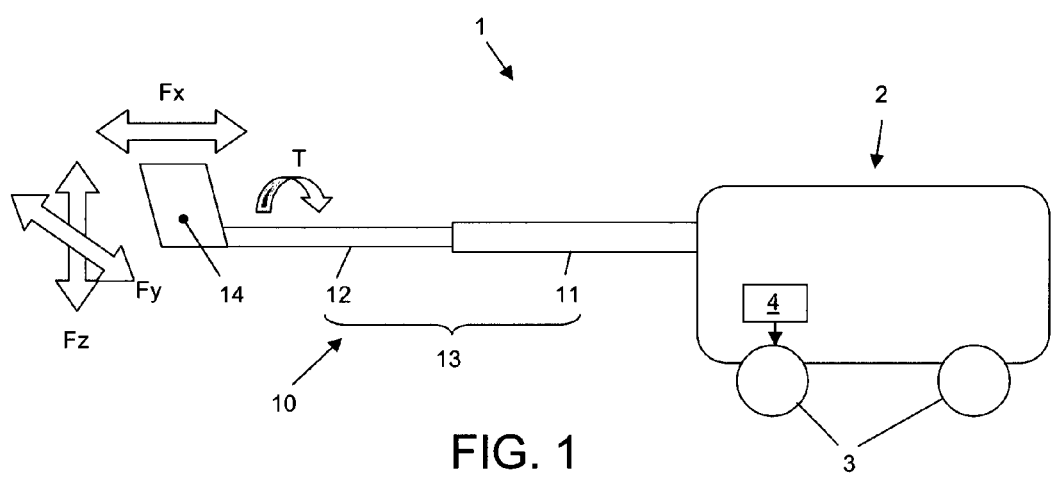
FIG. 1 is a schematic side view of a vehicle according to the present invention.

FIG. 1 schematically shows a vehicle 1 according to the present invention, comprising a main body or cabin 2 with wheels 3 and an extendable tail 10 mounted at the rear of the cabin 2. Propulsion means such as a propeller are not shown for sake of simplicity, and the same applies to lifting means such as a rotor. The vehicle 1 may have an automotive riding condition, in which it can drive on a road, in which case it comprises a motor 4 for driving at least one of the wheels 3.

The extendable tail 10 comprises at least one extendable tail beam 13 and a tail plane 14 mounted at the rear end of the tail beam 13. The tail beam 13 is extendable telescopically, and comprises a first tubular tail section 11 attached to the cabin 2 and a second tubular tail section 12 telescopically coupled to the first tail section 11. It is noted that the first tail section may be fixed with respect to the cabin 2 or may alternatively be extendable with respect to the cabin. It is further noted that the first tail section may be mounted at the rear of the cabin 2, as shown, but alternatively it is possible that the first tail section 11 is mounted at least partly above or below the cabin 2, or even within the cabin 2. It is further noted that the extendable tail beam 13 may include more than two sections telescopically coupled to each other. It is further noted that the tail sections 11, 12 are shown as straight tubes, but in practice such tubes may have some curvature. It is further noted that the second tail section 12 may be solid if it is not necessary that control cables run internally in the second tail section, but even then a hollow tube is preferred to save weight. It is further noted that the outer tube may be the rear tube while the inner tube is attached to the cabin. In case there are two or more tail beams, the above description applies to each tail beam.

The extendable tail 10 comprises a blocking mechanism that is not shown in FIG. 1. This blocking mechanism assures that the extended condition of the tail 10 is maintained during flight.

At its free end, the second tail section 12 carries the tail plane 14. Due to aerodynamic phenomena and inertia, the tail plane 14 exerts several forces on the second tail section, notably lateral forces Fx, transverse force Fy, vertical force Fz, and torque T. Further, the transverse and vertical forces cause a bending momentum in the tail. In the extended condition, the connection between the first and second tail sections 11, 12, hereinafter also indicated as tubes, needs to be such that said forces are securely transferred onto the first tube 11 and finally onto the cabin 2. The connection needs to be without play, since play leads to wear and tear of the connecting parts. On the other hand, after flight it should be relatively easy to disengage the connection and to retract the tail without the need of special equipment and without the need to exert large forces: the pilot should be able to do it manually himself. Conversely, before flight, the pilot should be able to manually extend the tail and to manually activate the blocking mechanism, in an easy manner with simple actions, and the design should be such that the chances on errors, which would cause the blocking mechanism to be fastened inadequately so that it may come loose during flight, are minimal.

FIG. 2A is a schematic longitudinal cross section of a portion of the tail beam 13, illustrating the design proposed by the present invention. In the orientation of the drawing, the front ends of the tubes are directed to the right and the rear ends of the tubes are directed to the left, as in FIG. 1. The direction to the right corresponds to the direction in which the second tube 12 is slid into the first tube 11, hence this direction will also be indicated as "inward direction", while the opposite direction will also be indicated as "outward direction".

At its rear end, the first tube 11 has a first toothed ring 21 attached to its inner surface, with teeth 22 directed to the front end of this first tube. In the following, this will be denoted as the first ring 21 having teeth 22 at its front face. The inner diameter of the first ring 21 is substantially equal to, preferably slightly larger than, the outer diameter of the second tube 12. The inner surface of the first ring 21 functions as bearing for slidably supporting and centering the second tube 12 within the first tube 11. In order to minimize friction, the inner surface of the first ring 21 may be provided of a low-friction coating or shell 23.

At its front end, the second tube 12 has a second toothed ring 31 attached to its outer surface, with teeth 32 at its rear face. The outer diameter of the second ring 31 is substantially equal to, preferably slightly smaller than, the inner diameter of the first tube 11. The outer surface of the second ring 31 functions as bearing for slidably supporting and centering the first tube 11 around the second tube 12. In order to minimize friction, the outer surface of the second ring 31 may be provided of a low-friction coating or shell 33.

At a first distance L1 directed towards the front with respect to the first ring 21, the first tube 11 has a third toothed ring 26 attached to its inner surface, with teeth 27 at its front face. At a second distance L2 directed towards the rear with respect to the second ring 31, the second tube 12 has a fourth toothed ring 36 attached to its outer surface, with teeth 37 at its rear face. The second distance L2 is substantially equal to the first distance L1. The inner diameter of the third ring 26 is larger than the outer diameter of the fourth ring 36.

The size of the distances L1 and L2 is not critical. However, since the coupling should be capable of transferring bending moments, L1 and L2 should not be too small. On the other hand, large values of L1 and L2 are impractical. Taking the outer diameter of the second tail section 12 as reference, L1 and L2 are preferably 1 to 10 times said diameter, more preferably 3 to 6 times said diameter, while a practically proven value is 4 times said diameter.

With the arrangement as described, the second tube 12 can telescopically slide towards the front, into the first tube 11. The first and second rings 21 and 31 will keep the tubes 11, 12 centered with respect to each other, and the third and fourth rings 26 and 36 will pass each other without touching each other. Alternatively, the first and second rings 21 and 31 are free from the opposing tubes, and each tube is provided with separate centring means. Such centring means may be provided as separate rings, or as blocks attached to the first and second rings 21 and 31. Further, instead of sliding blocks, the guiding facility may be provided by rotating balls.

The second tube 12 can travel into the first tube 11 until meeting a stop (not shown for sake of simplicity) defining the extreme retracted position of the second tube 12. FIG. 2B is a view comparable to FIG. 2A, showing the second tube 12 in a more retracted state.

To extend the tail 10, the second tail section 12 is telescopically slid towards the rear, out of the first tail section 11. The first and second rings 21 and 31 will keep the tail sections 11, 12 centered with respect to each other, and the third and fourth rings 26 and 36 will pass each other without touching each other. The second tube 12 is slid out of the first tube 11 until the first toothed ring 21 of the outer tube 11 engages the fourth toothed ring 36 of the inner tube 12 while at the same time the third toothed ring 26 of the outer tube 11 engages the second toothed ring 31 of the inner tube 12.

FIG. 2C is a view comparable to FIG. 2A, showing the second tail section 12 in its extreme extended position. It is noted that, during flight, aerodynamic drag tends to keep the second tail section 12 extended. Nevertheless, it may be desirable to have blocking means for positively preventing the second tail section 12 from sliding back into the first tail section 11. Such blocking means will normally not need to withstand large forces. In the embodiment shown, the blocking means are implemented as a transverse blocking pen 40, to be received in a transverse hole 41 of the first tail section 11. This blocking pen 40 may be threaded and/or tapered. It is noted that the blocking pen is shown exaggeratedly large in the figure.

In this extended state, the inner tube 12 is force-coupled to the outer tube 11 at two axially separated locations, i.e. a first coupling is constituted by the engaging first and fourth rings 21, 36 and a second coupling is constituted by the engaging second and third rings 31, 26. This allows for a good transfer of transversal forces, bending moments and torque. Lateral forces trying to draw the second tube 12 to the rear will be accommodated by said rings, acting as axial stops. Lateral forces trying to push the second tube 12 to the front, back into the outer tube 11, will be non-existing or only very small and can easily be counteracted by the blocking pen 40, which therefore does not need to be excessively large.

It should be clear that the required actions for converting the tail from its riding condition to its flying condition or vice versa are relatively simple. After flight, the pilot simply removes the pen 40 and pushes second tail segment 12 into the first tail segment 11. Conversely, before flight, the pilot simply pulls out the second tail segment 12 and inserts the blocking pen 40. If the second tail segment 12 is not in the correct position, it will be impossible to insert the blocking pen 40. On the other hand, if the blocking pen is inserted, this is visual proof that the second tail segment 12 is in the correct position.

Figure 3:
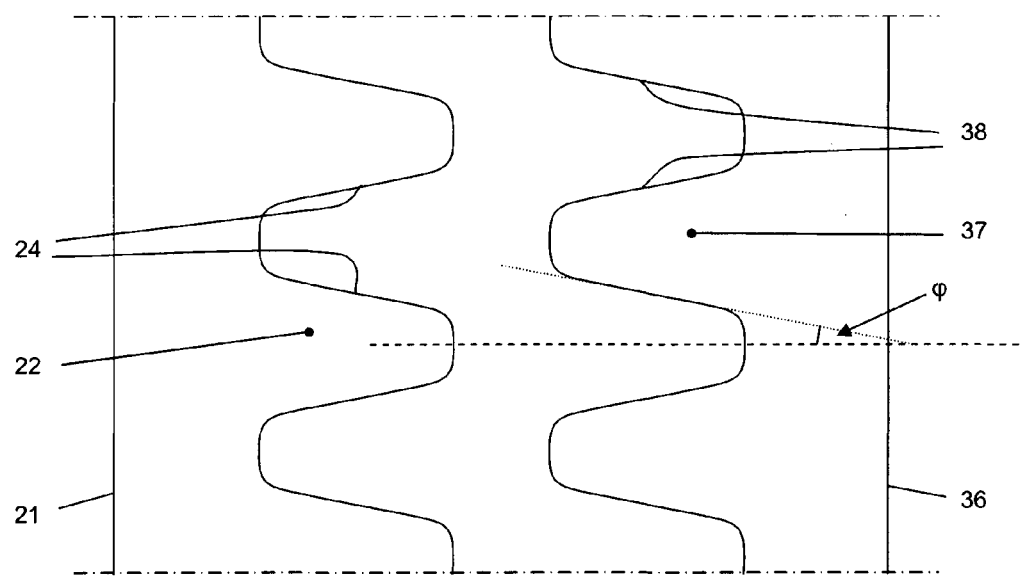
FIG. 3 illustrates details of a toothed coupling.

FIG. 3 is a schematic side view of a part of the toothed rings 21, 36 to show a possible embodiment of the shape of the teeth 22, 37. The same will apply for the rings 31, 26. While several variations will be possible, the teeth 22, 37 should have side faces 24, 38 making a slight angle $\phi$ with the axial direction. This angle $\phi$ should be larger than zero to make the teeth self-centering and to assure that the teeth engage and disengage easily. However, this angle $\phi$ should not be too large because then torque would lead to larger axial forces tending to disengage the teeth during flight. While a skilled person can easily find a value for said angle $\phi$ suitable in his particular design, depending on friction coefficient and manufacturing tolerances, in general an angle of about 6 degrees will be adequate.

It is noted that the cross-sectional contour of the tubes 11, 12 may be circular, but although that may be most conveniently to implement it is not essential. The present invention can also be implemented with tubes having for instance a rectangular or elliptical or oval cross-sectional contour.

It is further noted that a tail may comprise two or more telescopic tail beams mounted in parallel to achieve better stiffness and/or to be able to use tubes with smaller diameters.

In FIG. 1, the tail 10 is depicted as being mounted directly to the cabin 2. While there may indeed be situations where such design is satisfying, it does not lead to an optimal solution of the problems in designing a vehicle that should be able to be converted from a road riding configuration to an air flying configuration and back. In the flying configuration, the vehicle will have a propulsion propeller at the back, a lifting rotor on top, and a tail plane with ailerons held at some distance to the rear of the cabin. In the road riding configuration, the overall vehicle should be as compact as possible and it should have a center of gravity as low as possible. In the flying configuration, the rotation axis of the propeller should ideally intersect the center of gravity, and although some tolerance is acceptable, a low center of gravity means that the propeller must be mounted low so that the radial length of its propeller blades is limited since these blades must remain free from the ground. On the other hand, with a view to efficiency, it is desirable to have large radial length of the propeller blades.

The present invention proposes a solution for these design problems. At its upper side, the vehicle is provided with a collapsible mast carrying both the rotor and the tail. In the flying condition, the mast is in an upright condition, so the tail is raised and extends over the propeller blades. In the road riding condition, the mast is folded forwards to a horizontal condition, so that the tail lies close to the cabin roof and the overall vehicle is quite compact. This will be explained in more detail with reference to FIGS. 4A-4D, which are side views schematically showing the transition from road riding condition to flying condition.

Figure 4A:
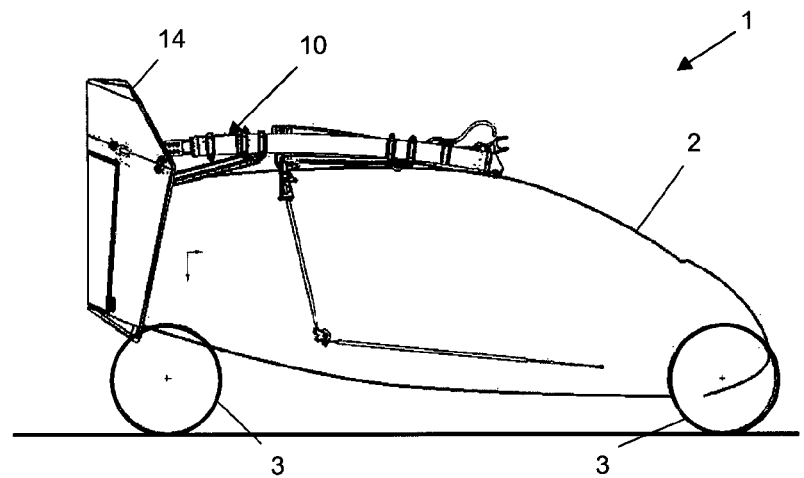
FIGS. 4A-4D are schematic side views of a ride/fly vehicle, showing the transition from road riding condition to flying condition.

FIG. 4A illustrates the road riding condition of the vehicle 1. It will be seen that the tail 10 lies close to the roof of the cabin 2, and that the tail plane 14 is close to the cabin, so that the vehicle 1 is very compact.

Figure 4B:
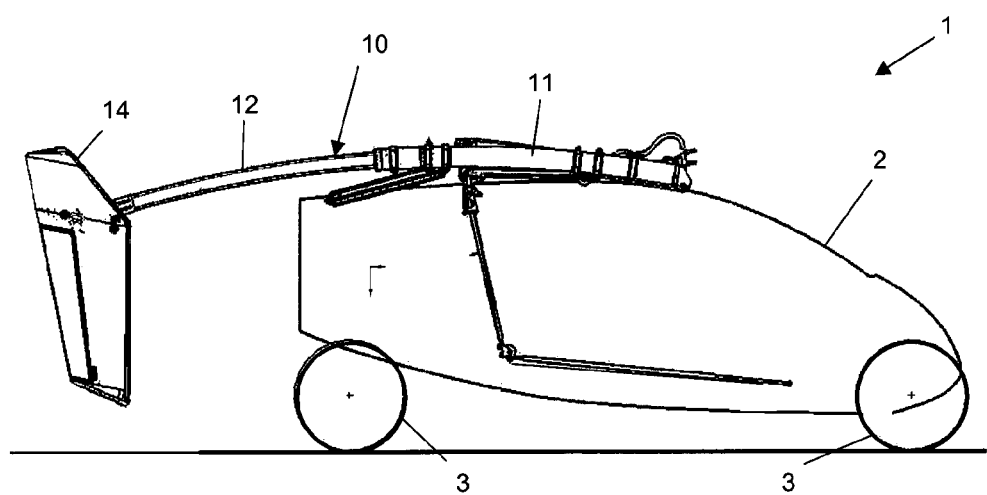

FIG. 4B illustrates that, as a first step in the conversion process towards the flying condition, the tail 10 is extended. It can be recognized in this figure that the tail 10 comprises the extendable tail beam with telescopic tail segments 11 and 12 as described earlier, and that these segments are slightly curved in order to have the tail beam conform to the curved aerodynamic shape of the cabin 2.

Figure 4C:
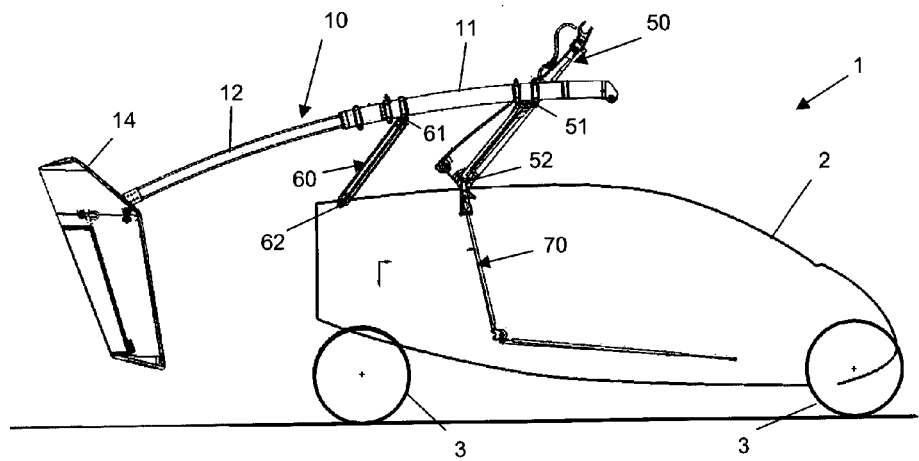

FIG. 4C illustrates that the vehicle 1 comprises a main mast 50 that is hinged to the roof of the cabin 2.

Figure 4D:
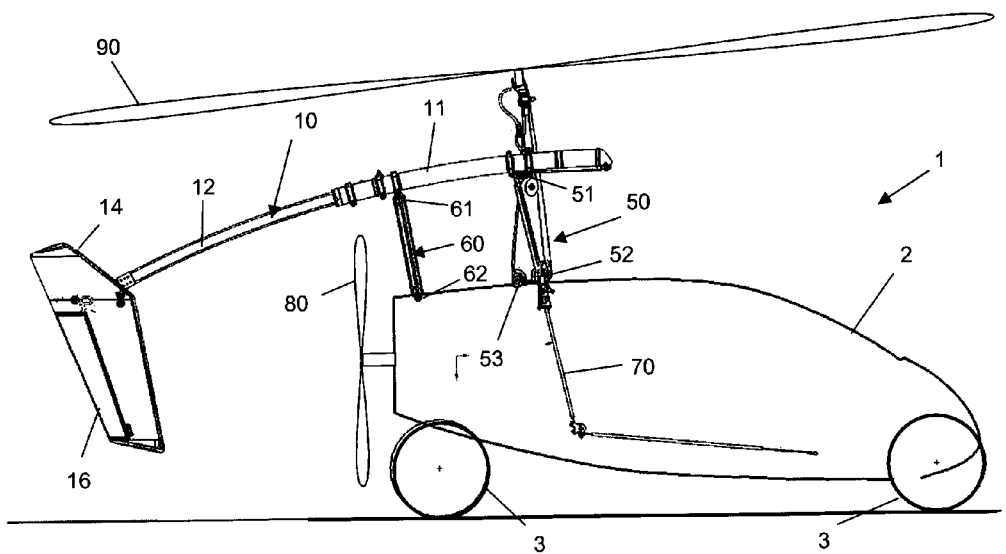

At its upper end, the mast 50 carries the rotor (see FIG. 4D). At its lower end, the mast 50 is hinged to the roof of the cabin 2, with a horizontal hinge axis 52 transverse to the longitudinal direction of the vehicle 1. At a position lower than the upper end of the mast 50, the tail 10 is hinged to the mast 50, with a horizontal hinge axis 51 parallel to the lower hinge axis 52. At some distance rearward of the mast 50, the vehicle 1 has a support structure 60 parallel to the main mast 50, also hinged to the roof of the cabin 2 with a hinge axis 62, and also hingedly supporting the tail 10 with a hinge axis 61. In projection onto a virtual midplane, these four hinges define a quadrangle that approximates a parallelogram. The mutual distance between the hinges on the main mast 50 may differ from the mutual distance between the hinges on the support structure 60, and/or the mutual distance between the hinges on the cabin roof may differ from the mutual distance between the hinges on the tail, to define a correct positioning of the tail with respect to the cabin in the road riding condition and to define a correct tail positioning in the flying condition.

In the FIGS. 4A and 4B, the mast 50 and support structure 60 lie lowered to the cabin roof so that they are not clearly visible. In FIG. 4C, the mast 50 and support structure 60 are being hinged to their upright condition, while in FIG. 4D this movement has been completed and the mast 50 and support structure 60 stand fully upright. Reference numeral 53 indicates a lock for locking the main mast 50 in its upright condition. A mechanism for erecting or lowering the mast 50 and support structure 60 may for instance comprise a hydraulic cylinder, mounted in the mast 50, but this is not shown for sake of simplicity.

In FIG. 4D, also the propeller 80 and the rotor 90 are shown. It will be seen that, at least in this flying condition, the blades of the propeller 80 can be relatively long, extending to above the cabin roof, while the tail 10 clearly extends over the propeller. It is further to be noted that with the raising of the mast 50 its upper end has been displaced to the rear of the vehicle, bringing the tail plane 14 further rearwards.

In a preferred embodiment, the tail 10 comprises two mutually parallel tail beams 13A and 13B arranged next to each other. This is not visible in the side views of FIGS. 4A-4D, but is schematically illustrated in the schematic top view of FIG. 5. The two tail beams 13A and 13B are mounted on opposite sides of the mast 50 and support structure 60. At their rear ends, the tail beams 13A and 13B are connected by a horizontal beam 15, which may be integrated with or implemented as tail foil. The tail 10 may comprise a single vertical tail plane or foil 14 mounted in the center of the horizontal foil 15, but it is preferred that the tail 14 comprises two vertical tail planes 14A and 14B at a mutual horizontal distance. It is noted that this is also possible in the case of a tail with a single tail beam. In the retracted condition of FIG. 4A, the two tail planes can be located on opposite sides of the rear portion of the cabin, as shown, for which purpose the cabin may have a slender rear portion giving the entire cabin a drop-shape.

Figure 5:
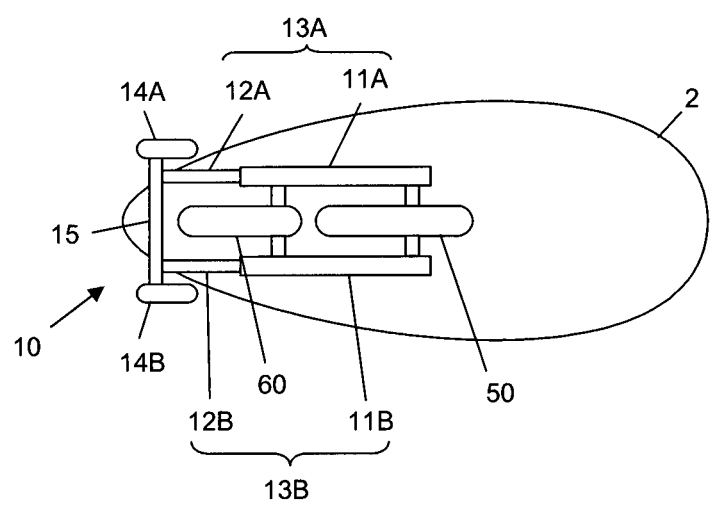
FIG. 5 is a schematic top view of a ride/fly vehicle.

In the figures, no constructive details are given of the support structure 60. In FIG. 5, the support structure 60 is shown as a single mast or pilar, which is a possible embodiment, indeed. Preferably, however, the support structure 60 is designed to increase transverse stability and torsion stability while adding as little weight as possible. To this end, the support structure 60 may comprise two (or more) mutually parallel masts mutually interconnected by diagonal cross beams.

As is illustrated in FIG. 4D, a tail plane 14 may comprise one or more rudders or ailerons 16. In such case, control cables for such aileron (shown at 70 within the cabin) are guided within the hollow tail beam 13. The length of such control cable should be adapted to the length of the tail beam 13 in its extended state, which implies that such control cable would be too long for the tail beam in its retracted state. Winding the excess length of cable on a roll involves introduction of a winding mechanism that may introduce the risk of getting stuck and/or leading to increased steering forces.

Figure 6A:
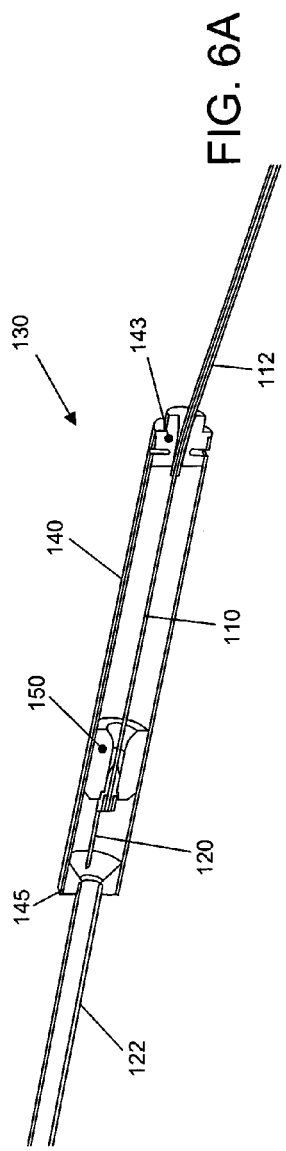
FIG. 6A is a schematic perspective view of a longitudinal sectioned cable coupling arrangement.
Figure 6B:
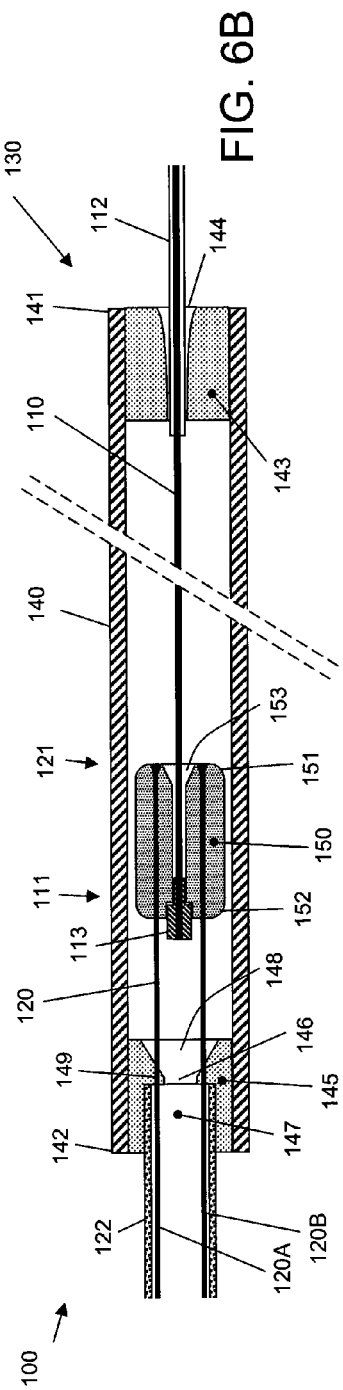
FIGS. 6B and 6C are schematic longitudinal sections of this arrangement at a larger scale.

The present invention proposes a solution to these problems, which involves implementing the cables in two parts that can shift axially with respect to each other. This solution will be explained with reference to FIGS. 6A and 6B, wherein FIG. 6A is a schematic perspective view of a longitudinal section while FIG. 6B is a schematic longitudinal section on a larger scale. It is noted that the relative sizes of the different components are not necessarily shown to scale.

Both figures show a portion of control cable assembly 100. This control cable assembly 100 runs within an extendable tail beam as described in the above, but for sake of simplicity such tail beam is not shown in FIGS. 6A and 6B. Normally, a cable runs as an integral whole from a control member (such as a pedal) to a controlled member (such as an aileron). According to a key aspect of the invention, the cable assembly 100 comprises a first cable part 110 having a first end (not shown) attached to a control member in the cabin and having an opposite free end 111, a second cable part 120 having a first end (not shown) attached to a controlled member at the end of the tail and having an opposite free end 121, and a coupling arrangement 130 coupling the free ends 111, 121 of the two cable parts 110, 120. It is noted that the cable may be divided in three or more cable parts, wherein always two subsequent cable parts are coupled by a respective coupling arrangement 130.

The first cable part 110 is accommodated, at least over a part of its length, in a cable sheath 112 having an inner diameter only slightly larger than the outer diameter of the first cable part 110 so that the first cable part 110 can slide freely in axial direction within the cable sheath 112. The cable sheath 112 is fixed to the end of the first tail segment closest to the cabin 2, i.e. the outer tube 11 of FIGS. 1 and 2A-2C. The cable sheath 112 should have sufficient stiffness, as will become clear later, yet a certain level of flexibility is preferred. A suitable material may be plastic.

The coupling arrangement 130 comprises a coupling tube 140 that is fixed with respect to the second tail segment directed away from the cabin, i.e. the inner tube 12 of FIGS. 1 and 2A-2C. At a first end 141, the tube 140 receives the free end of the first cable part 110 and its cable sheath 112. At its first end 141, the tube 140 is closed by a first plug 143 having an axial bore 144. This bore has a curved, trumpet-shaped entrance portion, narrowing towards the interior of the tube 140, to allow for mis-alignment between tube 140 and sheath 112. The opposite end of said bore has a straight end portion, which is the narrowest location, where the inner diameter of the bore 144 is slightly larger than the outer diameter of the cable sheath 112, so that the cable sheath 112 can slide freely through the bore 144.

At its opposite second end 142, the tube 140 receives the free end of the second cable part 120. Although not essential, it is preferred that the second cable part 120 is accommodated, at least over a part of its length, within a guiding tube 122. At its second end 142, the tube 140 is closed by a second plug 145 having an axial bore 146. Facing outwards, the second plug 145 has a chamber 147 receiving the end of guiding tube 122. Facing inwards, the bore 146 has a funnel-shaped catch-in portion 148. Adjacent the axial bore 146, the second plug 145 has a bore 149 for passing the second cable part 120.

Inside the coupling tube 140, a sliding coupling block 150 is arranged, having an outer diameter slightly smaller than the inner diameter of the coupling tube 140, so that the coupling block 150 can slide freely within the coupling tube 140 but can not tilt. The coupling block 150 has a first end 151 directed to the first end 141 of the tube 140 and a second end 152 directed to the second end 142 of the tube 140. The coupling block 150 has an axial bore 153, which at the first block end 151 may be tapered, as shown. The axial bore 153 has an inner diameter slightly larger than the outer diameter of the cable sheath 112, so that the cable sheath 112 can slide freely through the bore 153.

The first cable part 110 extends through the bore 153 of the coupling block 150. A stop 113 is fixed to the end 111 of the first cable part 110, this stop having a diameter larger than the diameter of the bore 153.

The end 121 of the second cable part 120 is fixed to the coupling block 150, at any suitable location on the block 150.

It may be that the control cable 100 is used to control two or more members. In such case, it is convenient to connect two or more second cable parts 120 to the coupling block 150, each of such respective second cable parts running to the respective controlled member. However, even if the control cable 100 is used to control only one member (for instance: aileron), it is nevertheless preferred that the second cable part 120 is implemented by two or more mutually parallel cables 120A, 120B which are attached to the coupling block 150 on opposite sides of the central bore 153, in a symmetrical manner, as shown, in order to avoid the generation of tilting forces on the block 150, which would undesirably increase friction of the block 150 within the tube 140.

The operation is as follows. FIG. 6B illustrates the situation when the tail 10 is in its extended state. It can be seen that the stop 113 of the first cable part 110 bears against the coupling block 150. The stop 113 may be accommodated partly or wholly within the coupling block 150. When the pilot actuates the control cable 100, a pulling force (directed to the right in FIG. 6B) is exerted on the first cable part 110, causing the coupling block 150 to be displaced within the coupling tube 140 (towards the right in FIG. 6B) which in turn causes the second cable part 120 to be pulled. In other words, the coupling block 150 has coupled the two cable parts 110 and 120 firmly together for securely transferring pulling forces. The inner length of the coupling tube 140, i.e. the distance between first plug 143 and second plug 145, defines the free stroke of the coupling block 150 and hence the free stroke of the control pedals. In a suitable embodiment, this stroke may be in the range of for instance 10-25 cm.

In turn, the second cable part 120 pulls the member to be controlled in one direction. For pulling this member in the opposite direction, a second cable assembly is present, identical to the cable assembly described above, but this second cable assembly is not shown for sake of simplicity. Each cable assembly only transfers pulling forces. When the pilot pulls the first cable part 110 of said assembly 100, the controlled member pulls the second cable assembly, as should be clear to a person skilled in the art.

When the tail 10 is retracted, the tube 140 with the second cable part 120 and the coupling block 150 is shifted towards the first cable part 110 and its cable sheath 112. After all, the tube 140 with the second cable part 120 and the coupling block 150 are fixed with respect to the inner tube 12 that is shifted to the right (in the figure) with respect to the outer tube 11, to which cable sheath 112 is fixed. Within the cabin 2, the control member to which the first cable part 110 is connected is coupled to the cabin chassis under spring-bias, so that this control member is displaced in the cabin to keep the first cable part 110 tight. With respect to the tube 140, the second cable part 120 and the coupling block 150 and the first cable part 110 remain stationary while the cable sheath 112 is displaced towards the left. The tail 10 can be retracted over a distance larger than the above-mentioned stroke; said distance may for instance be in the range of about 2 m. Thus, the free end of the cable sheath 112 will meet the block 150 and will enter the central bore 153 thereof. Finally, the free end of the cable sheath 112 will abut the stop 113 at the free end 111 of the first cable part 110.

Figure 6C:
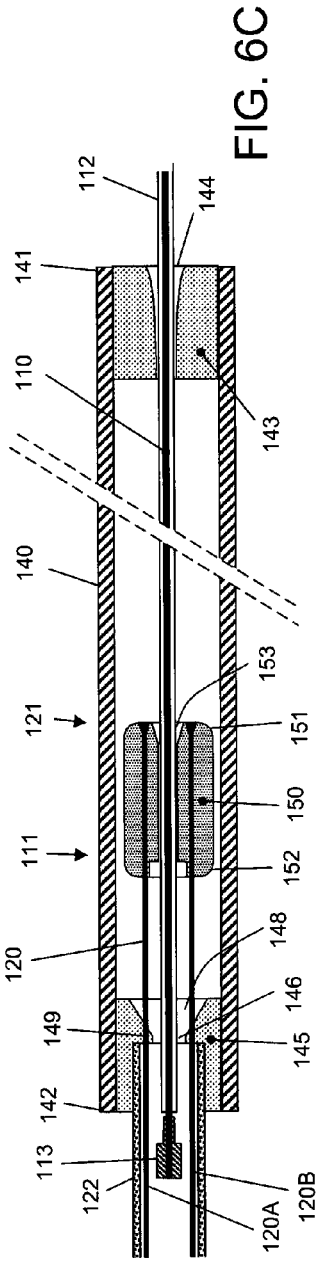

At its narrowest location, the inner diameter of the bore 146 is larger than the outer diameter of stop 113. With further retraction of the tail, the free end of the cable sheath 112 will take along the free end 111 of the first cable part 110, and together they will move to the left, depart from the block 150 and exit the coupling tube 140 through the bore 146 of the second plug 145, into the preferred guiding tube 122. This situation is illustrated in FIG. 6C.

Thus, the first cable part 110 is maintained in a tensioned state at all times, avoiding the risk of a loose-hanging cable getting stuck.

When the tail is extended again, the above displacements take place in the reverse direction. It is noted that the stop 113, at its side directed to the first cable part 110, may be tapered to facilitate centering of the stop 113 with respect to the bore 153 in block 150 when the tail is extended.

FIG. 4D illustrates that the blades of the rotor 90 have a relatively large length. In the riding condition, such rotor 90 would be too large for the vehicle. In order to keep the rotor blades within the desired width profile of the vehicle in the riding condition, the rotor blades are hingeable with respect to the mast 60, so that, in the riding condition, the rotor blades are directed substantially parallel to the tail 10. Nevertheless, the rotor blades will still be too long in the sense that they project beyond the rear end of the vehicle. In order to overcome this problem, the rotor blades may be foldable such as to reduce the blade length. This means that a rotor blade would consist of two (or more) blade sections that are hingedly connected to each other.

Foldable rotor blades have already been proposed before: reference is made for instance to U.S. Pat. No. 7,857,590 and WO-2006/041287. However, implementing a foldable rotor blade poses problems which the prior art has not yet solved in a satisfying manner.

A first problem is that, in the flying condition, the blade sections must be fixed with respect to each other in the folded-out condition, and the fixing arrangement must be sufficiently strong to accommodate the huge centrifugal forces, bending moments and torque occurring in the blade. Further, vibration of the blade parts should be prevented as much as possible, because vibration is annoying to the pilot and may lead to failure of components through fatigue.

A second problem relates to aerodynamics. The hinge design should be such that it has acceptable aerodynamic properties, taking into account that the wind velocity at the mid section of a rotor blade (which is about the location of the hinge members) may easily be 300 km/h. A bad aerodynamic shape may lead to energy loss and/or vibrations.

A third problem relates to costs. The design should be such that it can be manufactured at reasonable cost.

The present invention offers a solution to the above problems, which will be explained with reference to FIG. 7 and further.

Figure 7:
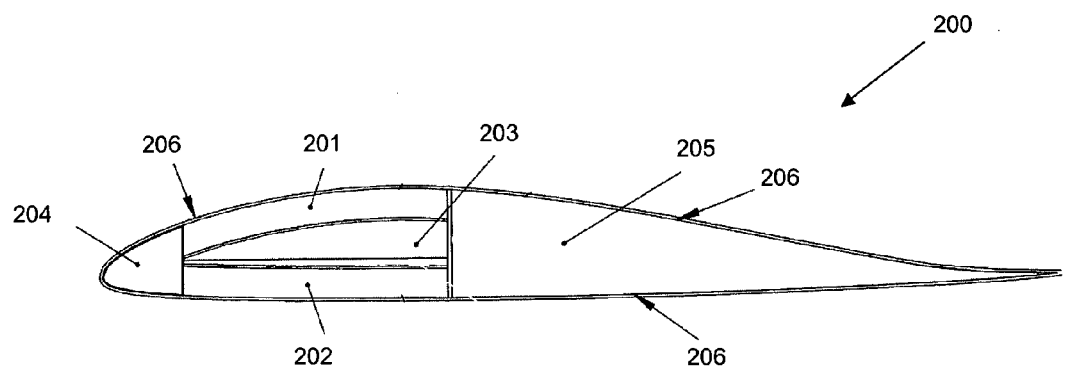
FIG. 7 is a schematic cross section of a rotor blade.

FIG. 7 is a schematic cross section of a rotor blade or foil 200, generally explaining a blade design made from composite materials that has proved itself in practice. The blade 200 comprises an upper spar 201 and a lower spar 202 arranged above each other, which are constituted by mainly unidirectional fiber material with the fiber oriented in the length-direction of the blade, i.e. perpendicular to the plane of drawing. This fiber material is capable of accommodating high lateral tension forces, such as caused by centrifugal forces. The space between the two spars 201, 202 is filled with a low-weight material 203, for instance a foam or a honeycomb structure. At the front side of the spars 201, 202, the blade 200 comprises a substantially D-shaped member 204 that serves to increase the weight at the front side of the blade, to improve stability; this member 204 may for instance comprise lead. At the trailing side of the spars 201, 202, the blade 200 consists mainly of low-weight filling material 205, like the material 203. The blade's outer surface is defined by a skin layer 206 around the above-mentioned components.

Figure 8A:
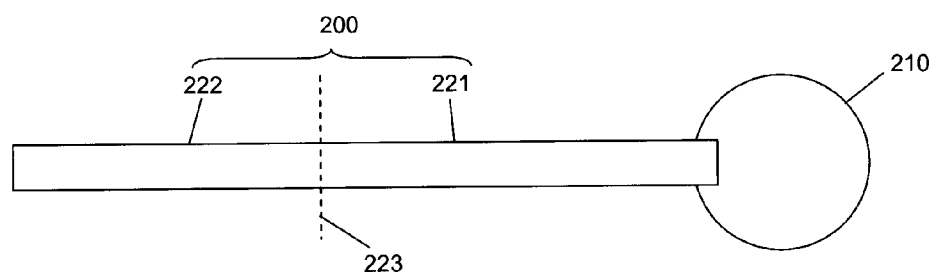
FIG. 8A is a schematic top view of the rotor blade.

FIG. 8A is a schematic top view of the blade 200, illustrating that the blade 200 consists of two blade sections 221 and 222. Blade section 221 is attached to a rotor hub 210 and will be indicated as inner blade section. Blade section 222, which will be indicated as outer blade section, is attached to the extreme end of the inner blade section 221, aligned therewith, in such a manner that the outer blade section 222 can hinge upwards with respect to a horizontal transverse hinge axis 223 to be folded over the inner blade section 221.

Figure 8B:
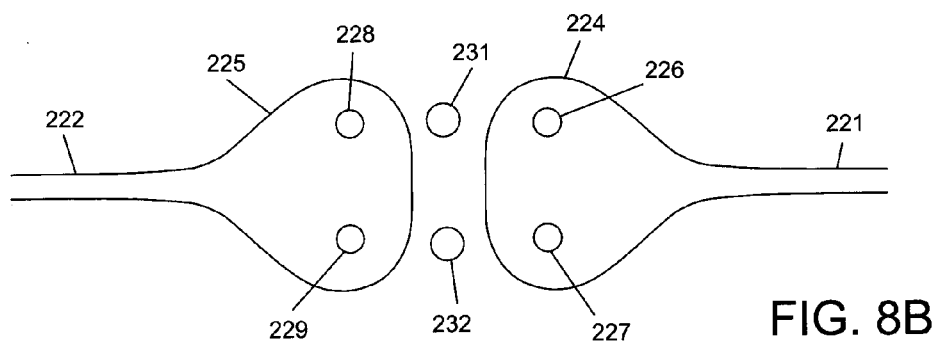
FIG. 8B is a schematic side view of a portion of the rotor blade at a larger scale.

FIG. 8B is a schematic side view of a portion of the blade 200 at a larger scale, showing the outer end 224 of the inner blade section 221 and the inner end 225 of the outer blade section 222 in taken-apart condition for sake of clarity. The outer end 224 of the inner blade section 221 has an increased height as compared to the remainder of the inner blade section 221, and comprises two transverse coupling holes 226 and 227 arranged above each other. Likewise, the inner end 225 of the outer blade section 222 has an increased height as compared to the remainder of the outer blade section 222, and comprises two transverse coupling holes 228 and 229 arranged above each other. In the coupled condition, the upper coupling holes 226, 228 will be aligned with each other, with a coupling pin 231 extending through said holes. This pin also functions as hinge pin: for converting the rotor blade 200 to the riding condition, the outer blade section 222 can be hinged upwards with respect to this pin 231 to be laid on top of the inner blade section 221. In the flying condition, the outer blade section 222 will be hinged down to a position aligned with the inner blade section 221 where the lower coupling holes 227, 229 are aligned with each other. The blade 200 is secured in this position by inserting a locking pin 232 through said lower coupling holes 227, 229.

Alternatively, the upper pin may be locking pin while the lower pin may be hinge pin.

In the flying condition, forces will be transferred via the coupling pin 231 and the locking pin 232. From the above description of the blade design, it will be clear that the forces mainly occur in the spars 201, 202; the other blade components transfer hardly or no force in the blade's longitudinal direction. From this perspective, the precise manner in which the other blade components 203, 204, 205, 207 are shaped at the outer end 224 of the inner blade section 221 and the inner end 225 of the outer blade section 222 is not critical and has no consequence for the present invention; therefore, these components will be ignored in the following.

In a normal, unsectioned blade, the fibers in each spar always run over the entire length of the blade. According to the present invention, each fiber is laid in a vertical loop around one of said coupling holes.

Figure 9A:
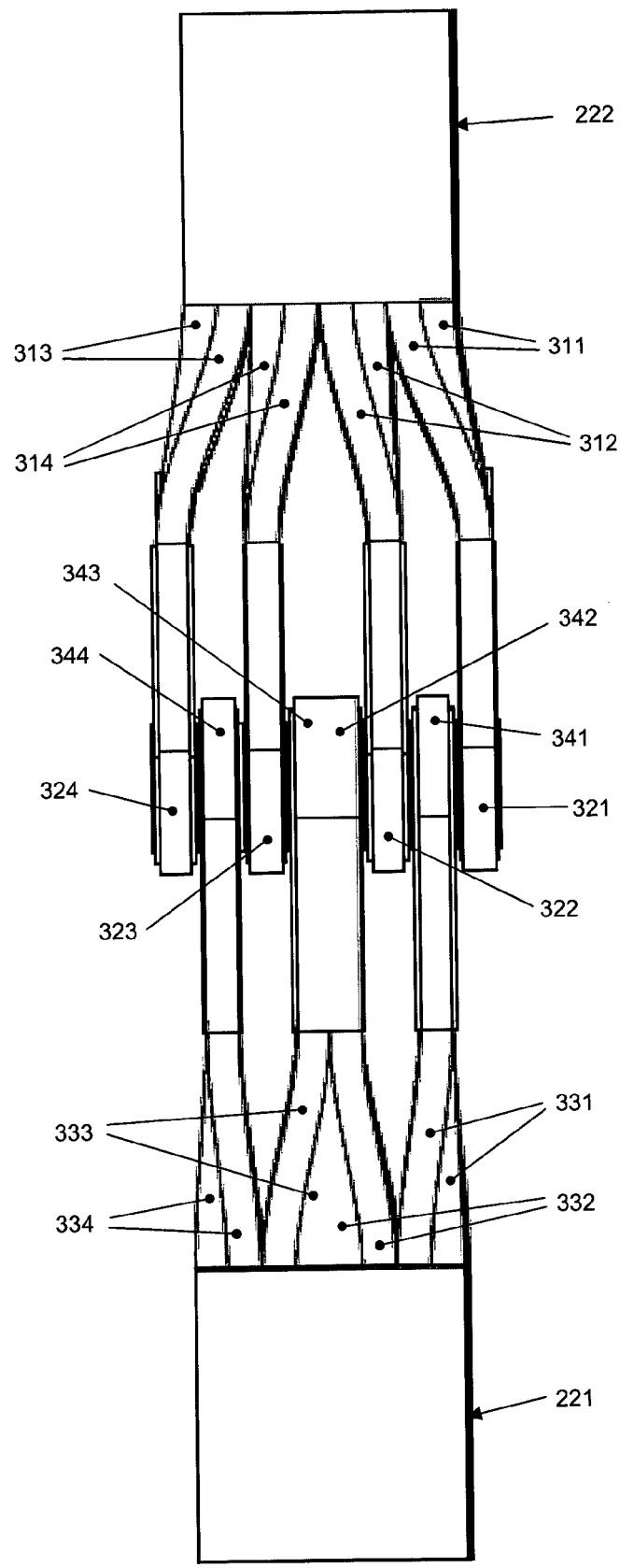
FIGS. 9A to 9C are views illustrating the joint between rotor blade sections according to the present invention.
Figure 9B:
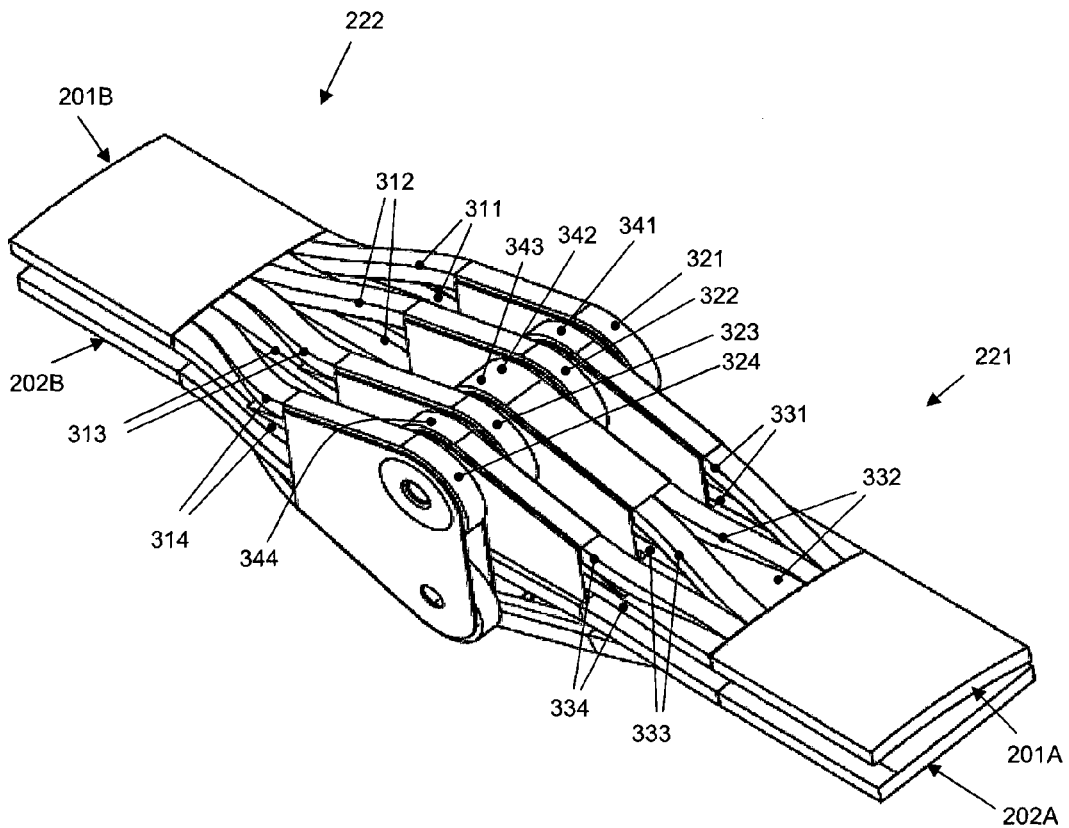

FIG. 9A is a top view of the joint between inner blade section 221 and outer blade section 222 showing this inventive feature in more detail, and FIG. 9B is a perspective view of this joint. In FIG. 9B, the upper spar and lower spar of the inner blade section 221 are indicated by reference numerals 201A and 202A, respectively, while the upper spar and lower spar of the outer blade section 222 are indicated by reference numerals 201B and 202B, respectively.

Figure 9C:
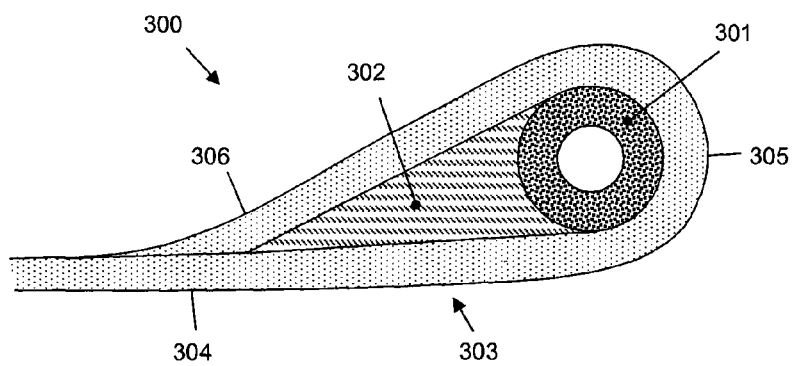

In each spar, the fibers are subdivided in bundles or groups. Each fiber group in a spar is looped around in a vertical plane over an angle of 180° and laid back next to itself, to define a coupling eye. FIG. 9C is a schematic side view of such coupling eye 300, which comprises a support ring 301 and a support wedge 302, which may be separate or formed as an integral whole. A fibre group 303 consists of three sections: a first spar section 304, a loop section 305 and a second spar section 306. The loop section 305 is looped around the support ring 301 and the support wedge 302, and the second spar section 306 is positioned next to the first spar section 304. This is repeated for multiple fiber groups, wherein always the spar sections of adjacent groups are positioned close together whereas the respective coupling eyes will be arranged at a mutual distance. It should be clear that all spar sections together define the spar of a blade section.

In manufacture, a mould will be used in which several support rings plus accompanying support wedges are held in the correct position and mutual distance, having their central holes ligned, and in which separation walls will keep the fibre groups confined. The resulting intermediate product will be a spar of a blade section, with integral coupling eyes. In a subsequent assembly step, two of such intermediate spar products will be arrange on top of each other to form a blade section.

In FIGS. 9A and 9B, the upper spar 201B of the outer blade section 222 comprises four fibre groups 311, 312, 313, 314 which define four coupling eyes 321, 322, 323, 324. The same applies to the lower spar 202B of the outer blade section 222.

The upper spar 201A of the inner blade section 221 likewise comprises four fibre groups 331, 332, 333, 334 which define four coupling eyes 341, 342, 343, 344. The same applies to the lower spar 202A of the inner blade section 221.

It can be seen that in the assembled condition coupling eyes of the outer blade section 222 are aligned with and alternate with coupling eyes of the inner blade section 221. This applies to the upper spar 201A, 201B and to the lower spar 202A, 202B. Therefore, the difference between the number of coupling eyes of the inner blade section 221 and the number of coupling eyes of the outer blade section 222 will usually be equal to zero or one.

In the embodiment of FIGS. 9A and 9B, the second and third coupling eye 342, 343 of the inner blade section 221 are not arranged at a distance to accept a coupling eye of the outer blade section in between them, but are located next to each other, so that they can be considered as one single coupling eye. This is however not necessary.

Generally speaking, the number of fibers in the upper and lower spar sections of the inner blade will be mutually substantially equal, and the same applies to the upper and lower spar sections of the outer blade. When comparing inner blade and outer blade, the number of fibers in the inner blade will typically be larger than the number of fibers in the outer blade, to accommodate for the fact that the loads in the inner blade are higher than the loads in the outer blade. Within a spar, it is possible that the number of fibers decreases with increasing distance from the rotor center. The thicknesses of the coupling eyes may differ. In the embodiment shown, the thickness of the central coupling eye 342, 343 of the inner blade section 221 is larger than the thickness of the other coupling eyes 341, 344 of the inner blade section 221, which in turn have a thickness equal to the coupling eyes of the outer blade section 222. However, it is also possible that the inner blade section 221 has three coupling eyes of mutually the same thickness, larger than the thickness of the coupling eyes of the outer blade section 222.

It is noted that the number of coupling eyes of a spar is not critical; this number is at least equal to 2, preferably 3 or 4 or 5. In the case of a spar having a width of 12 cm, the fiber groups may for instance have a width of 15 mm.

It is further noted that, in the assembled condition, an aerodynamically shaped cap will be arranged around the joint.

While the invention has been illustrated and described in detail in the drawings and foregoing description, it should be clear to a person skilled in the art that such illustration and description are to be considered illustrative or exemplary and not restrictive. The invention is not limited to the disclosed embodiments; rather, several variations and modifications are possible within the protective scope of the invention as defined in the appending claims.

For instance, for driving the propeller 80, a separate motor may be provided. However, it is also possible that the motor 4 is common for the wheels 3 and the propeller 80, with switching means for directing the motor output either to the wheels 3 or to the propeller 80.

Further, while it is possible to use a separate tube 140 fixed with respect to the inner tube 12, it is also possible that the inner tube 12 itself fulfils the role of tube 140. In such case, plugs 143 and 145 are mounted within the tubular tail section 12, defining between themselves a portion of tail section 12 acting as inner space of tube 140 in which the coupling block 150 is disposed.

Other variations to the disclosed embodiments can be understood and effected by those skilled in the art in practicing the claimed invention, from a study of the drawings, the disclosure, and the appended claims. Any reference signs in the claims should not be construed as limiting the scope.

The invention claimed is:

1. Telescopically extendable tail for a flying vehicle comprising:
   at least one tail beam comprising a first tubular tail segment; and
   a second tail segment disposed within the first tubular tail segment and axially slideable in an inward direction and in an outward direction;
   the tail beam being provided with at least two form-closing coupling members located at an axial distance from each other for providing a force-transferring coupling between the second tail segment and the first tubular tail segment in an extended state of the second tail segment;

wherein each of the form-closing coupling members are capable of transferring torque and transverse forces;
wherein each of the form-closing coupling members coming into engagement by axial displacement of the second tail segment in the outward direction;
wherein one of the form-closing coupling members comprise two internal toothed rings, and the other one of the form-closing coupling members comprise two external toothed rings; and
wherein the most inward one of the internal toothed rings has an inner diameter larger than an outer diameter of the most outward one of the external toothed rings.

2. Tail according to claim 1, wherein the first tubular tail segment is provided with the two internal toothed rings located at a first mutual axial distance;
wherein the second tail segment is provided with the two external toothed rings located at a second mutual axial distance substantially equal to the first mutual axial distance;
wherein both internal toothed rings of the first tubular tail segment have teeth directed in the inward direction; and
wherein both external toothed rings of the second tail segment have teeth directed in the outward direction.

3. Tail according to claim 2, wherein the most outward one of the internal toothed rings of the first tubular tail segment has an inner diameter substantially equal to an outer diameter of the second tail segment; and
wherein the most inward one of the external toothed rings of the second tail segment has an outer diameter substantially equal to an inner diameter of the first tubular tail segment.

4. Tail according to claim 1 further comprising a blocking means for blocking the second tail segment in its extended state.

5. Tail according to claim 4, the blocking means comprising a transverse blocking pen to be inserted transversely into the first tubular tail segment.

6. Flying vehicle comprising a tail according to claim 1.

7. Vehicle being convertible between a flying condition and an automotive riding condition, the vehicle comprising:
a tail according to claim 1;
wherein in the flying condition the tail is extended while in the automotive riding condition the tail is retracted.

8. Telescopically extendable tail for a flying vehicle comprising:
at least one tail beam, the tail beam comprising a first tubular tail segment and a second tail segment disposed within the first tubular tail segment and axially slideable in an inward direction and in an outward direction;
the tail beam being provided with a first form-closing coupling member for providing a force-transferring coupling between the second tail segment and the first tubular tail segment in an extended state of the second tail segment;
wherein the first form-closing coupling member is capable of transferring torque and transverse forces; and
wherein the first form-closing coupling member comes into engagement by axial displacement of the second tail segment in the outward direction;
the tail beam being provided with a second form-closing coupling member for providing a force-transferring coupling between the second tail segment and the first tubular tail segment in an extended state of the second tail segment;
wherein the second form-closing coupling member is capable of transferring torque and transverse forces; and
wherein the second form-closing coupling member comes into engagement by axial displacement of the second tail segment in the outward direction;
wherein the two form-closing coupling members are located at an axial distance from each other;
wherein the first form-closing coupling member comprises two internal toothed rings, and the second form-closing coupling member comprises two external toothed rings; and
wherein the most inward one of the internal toothed rings has an inner diameter larger than an outer diameter of the most outward one of the external toothed rings.

9. Vehicle being convertible between a flying condition and an automotive riding condition, the vehicle comprising:
a tail according to claim 8;
wherein in the flying condition the tail is extended while in the automotive riding condition the tail is retracted.

10. Telescopically extendable tail according to claim 8, wherein the internal toothed rings have teeth directed in the inward direction; and
wherein the external toothed rings have teeth directed in the outward direction.

11. Telescopically extendable tail according to claim 8, wherein the most outward one of the internal toothed rings has an inner diameter substantially equal to an outer diameter of the second tail segment; and
wherein the most inward one of the external toothed rings has an outer diameter substantially equal to an inner diameter of the first tubular tail segment.

12. Telescopically extendable tail according to claim 8 further comprising a blocking means for blocking the second tail segment in its extended state.

13. Telescopically extendable tail according to claim 12, wherein the blocking means comprises a transverse blocking pen inserted transversely into the first tubular tail segment.

14. Telescopically extendable tail for a flying vehicle comprising:
at least one tail beam, the tail beam comprising a first tubular tail segment and a second tail segment disposed within the first tubular tail segment and axially slideable in an inward direction and in an outward direction;
the tail beam being provided with a first form-closing coupling member for providing a force-transferring coupling between the second tail segment and the first tubular tail segment in an extended state of the second tail segment;
wherein the first form-closing coupling member is capable of transferring torque and transverse forces;
wherein the first form-closing coupling member comprises a first coupling element attached to the first tubular tail segment and a second coupling element attached to the second tail segment; and
wherein the first coupling element and the second coupling element of the first form-closing coupling member come into engagement with each other by axial displacement of the second tail segment in the outward direction;
the tail beam being provided with a second form-closing coupling member for providing a force-transferring coupling between the second tail segment and the first tubular tail segment in an extended state of the second tail segment;

wherein the second form-closing coupling member is capable of transferring torque and transverse forces;

wherein the second form-closing coupling member comprises a first coupling element attached to the first tubular tail segment and a second coupling element attached to the second tail segment; and wherein the first coupling element and the second coupling element of the second form-closing coupling member come into engagement with each other by axial displacement of the second tail segment in the outward direction;

wherein the two form-closing coupling members are located at an axial distance from each other;

wherein each of the first and second coupling elements of the first form-closing coupling member comprise an internal toothed ring, and each of the first and second coupling elements of the second form-closing coupling member comprise an external toothed rings; and wherein the most inward one of the internal toothed rings has an inner diameter larger than an outer diameter of the most outward one of the external toothed rings.

15. Vehicle being convertible between a flying condition and an automotive riding condition, the vehicle comprising: a tail according to claim 14;

wherein in the flying condition the tail is extended while in the automotive riding condition the tail is retracted.

16. Telescopically extendable tail according to claim 14, wherein the internal toothed rings have teeth directed in the inward direction; and wherein the external toothed rings have teeth directed in the outward direction.

17. Telescopically extendable tail according to claim 14, wherein the most outward one of the internal toothed rings has an inner diameter substantially equal to an outer diameter of the second tail segment; and wherein the most inward one of the external toothed rings has an outer diameter substantially equal to an inner diameter of the first tubular tail segment.

18. Telescopically extendable tail according to claim 14 further comprising a blocking means for blocking the second tail segment in its extended state.

19. Telescopically extendable tail according to claim 18, wherein the blocking means comprises a transverse blocking pen inserted transversely into the first tubular tail segment.

* * * * *